(12) United States Patent
Walkoe et al.

(10) Patent No.: US 7,971,071 B2
(45) Date of Patent: Jun. 28, 2011

(54) INTEGRATED DELIVERY AND PROTECTION DEVICE FOR DIGITAL OBJECTS

(76) Inventors: Wilbur J. Walkoe, Brookings, OR (US); John Walkoe, Norristown, PA (US)

( * ) Notice: Subject to any disclaimer, the term of this patent is extended or adjusted under 35 U.S.C. 154(b) by 0 days.

(21) Appl. No.: 11/752,072

(22) Filed: May 22, 2007

(65) Prior Publication Data

US 2008/0141381 A1     Jun. 12, 2008

Related U.S. Application Data (60) Provisional application No. 60/803,080, filed on May 24, 2006.

(51) Int. Cl.
*G06F 12/14* (2006.01)
(52) U.S. Cl. ........ 713/193; 713/165; 713/166; 713/167; 726/2; 726/27
(58) Field of Classification Search .................. None
See application file for complete search history.

(56) References Cited

U.S. PATENT DOCUMENTS

| | | | |
|---|---|---|---|
| 6,012,145 A * | 1/2000 | Mathers et al. | 726/17 |
| 6,523,119 B2 * | 2/2003 | Pavlin et al. | 713/192 |
| 6,694,384 B1 * | 2/2004 | Moeller et al. | 710/8 |
| 7,000,109 B2 * | 2/2006 | Girard | 713/168 |
| 2001/0056539 A1 * | 12/2001 | Pavlin et al. | 713/193 |
| 2002/0083318 A1 | 6/2002 | Larose | |
| 2002/0173273 A1 * | 11/2002 | Spurgat et al. | 455/66 |
| 2002/0176575 A1 | 11/2002 | Qawami et al. | |
| 2002/0186842 A1 | 12/2002 | Sabet-Sharghi et al. | |
| 2003/0088868 A1 | 5/2003 | Chang et al. | |
| 2003/0167395 A1 | 9/2003 | Chang et al. | |
| 2004/0068644 A1 | 4/2004 | Hutton et al. | |
| 2004/0080985 A1 | 4/2004 | Chang et al. | |
| 2004/0080998 A1 | 4/2004 | Chang et al. | |
| 2004/0083333 A1 | 4/2004 | Chang et al. | |
| 2004/0083334 A1 | 4/2004 | Chang et al. | |
| 2004/0083348 A1 | 4/2004 | Chang et al. | |
| 2004/0083405 A1 | 4/2004 | Chang et al. | |
| 2004/0103241 A1 | 5/2004 | Chang et al. | |
| 2004/0177212 A1 | 9/2004 | Chang et al. | |
| 2004/0210715 A1 | 10/2004 | Harari et al. | |
| 2005/0091445 A1 | 4/2005 | Chang et al. | |
| 2005/0144362 A1 | 6/2005 | Lin et al. | |
| 2005/0144468 A1 | 6/2005 | Northcutt et al. | |
| 2006/0149896 A1 | 7/2006 | Chang et al. | |
| 2006/0176068 A1 | 8/2006 | Holtzman et al. | |
| 2006/0177064 A1 | 8/2006 | Holtzman et al. | |
| 2006/0206701 A1 | 9/2006 | Hutton et al. | |
| 2006/0242064 A1 | 10/2006 | Jogand-Coulomb et al. | |
| 2006/0242065 A1 | 10/2006 | Jogand-Coulomb et al. | |
| 2006/0242066 A1 | 10/2006 | Jogand-Coulomb et al. | |

(Continued)

OTHER PUBLICATIONS

Sandisk Corporation, SanDisk Unveils Public Beta of Fanfare, Oct. 22, 2007 News Release, SanDisk Corporation, Milpitas, CA.

(Continued)

*Primary Examiner* — Benjamin E Lanier
(74) *Attorney, Agent, or Firm* — Hovey Williams LLP; Adam C. Rehm (57) ABSTRACT

A method of securing a digital object with a secure hardware adjunct in communication with a digital device, comprising configuring the digital object on the secure hardware adjunct so that the digital object may be portable among digital devices, executing a first portion of code on the digital device, and providing predefined digital rights verification and enforcement located on the secure hardware adjunct.

19 Claims, 2 Drawing Sheets

U.S. PATENT DOCUMENTS

| | | |
|---|---|---|
| 2006/0242067 A1 | 10/2006 | Jogand-Coulomb et al. |
| 2006/0242068 A1 | 10/2006 | Jogand-Coulomb et al. |
| 2006/0242150 A1 | 10/2006 | Jogand-Coulomb et al. |
| 2006/0242151 A1 | 10/2006 | Jogand-Coulomb et al. |
| 2006/0272032 A1 | 11/2006 | Jogand-Coulomb et al. |
| 2007/0002612 A1 | 1/2007 | Chang |
| 2007/0011724 A1 | 1/2007 | Gonzalez et al. |
| 2007/0016941 A1 | 1/2007 | Gonzalez et al. |
| 2007/0043667 A1 | 2/2007 | Qawami et al. |
| 2007/0056042 A1 | 3/2007 | Qawami et al. |
| 2007/0061581 A1 | 3/2007 | Holtzman et al. |
| 2007/0061597 A1 | 3/2007 | Holtzman et al. |
| 2007/0061897 A1 | 3/2007 | Holtzman et al. |
| 2007/0106919 A1 | 5/2007 | Chang et al. |
| 2007/0116287 A1 | 5/2007 | Rasizade et al. |
| 2007/0116288 A1 | 5/2007 | Rasizade et al. |
| 2007/0136501 A1 | 6/2007 | Chang et al. |
| 2007/0145135 A1 | 6/2007 | Jogand-Coulomb et al. |
| 2007/0145152 A1 | 6/2007 | Jogand-Coulomb et al. |
| 2007/0150694 A1 | 6/2007 | Chang et al. |
| 2007/0150884 A1 | 6/2007 | Jogand-Coulomb |
| 2007/0168292 A1 | 7/2007 | Jogand-Coulomb et al. |
| 2007/0168668 A1 | 7/2007 | Chang et al. |
| 2007/0215847 A1 | 9/2007 | Nishiura et al. |
| 2007/0234341 A1 | 10/2007 | Chang et al. |
| 2007/0237329 A1 | 10/2007 | Qawami et al. |
| 2007/0267474 A1 | 11/2007 | Shen et al. |
| 2007/0271472 A1 | 11/2007 | Grynberg |
| 2007/0282747 A1 | 12/2007 | Shen et al. |
| 2008/0010449 A1 | 1/2008 | Holtzman et al. |
| 2008/0010452 A1 | 1/2008 | Holtzman et al. |
| 2008/0010455 A1 | 1/2008 | Holtzman et al. |
| 2008/0010685 A1 | 1/2008 | Holtzman et al. |
| 2008/0013411 A1 | 1/2008 | Thorp et al. |
| 2008/0016312 A1 | 1/2008 | Thorp et al. |
| 2008/0022395 A1 | 1/2008 | Holtzman et al. |
| 2008/0034440 A1 | 2/2008 | Holtzman et al. |
| 2008/0052686 A1 | 2/2008 | Jogand-Coulomb et al. |
| 2008/0065818 A1 | 3/2008 | Lin et al. |
| 2008/0067255 A1 | 3/2008 | Harari et al. |
| 2008/0086693 A1 | 4/2008 | Jogand-Coulomb et al. |
| 2008/0112562 A1 | 5/2008 | Jogand-Coulomb et al. |
| 2008/0112566 A1 | 5/2008 | Jogand-Coulomb et al. |
| 2008/0114686 A1 | 5/2008 | Jogand-Coulomb et al. |
| 2008/0114692 A1 | 5/2008 | Jogand-Coulomb et al. |
| 2008/0114693 A1 | 5/2008 | Jogand-Coulomb et al. |
| 2008/0114772 A1 | 5/2008 | Jogand-Coulomb et al. |
| 2008/0114880 A1 | 5/2008 | Jogand-Coulomb et al. |
| 2008/0114958 A1 | 5/2008 | Jogand-Coulomb et al. |
| 2008/0114995 A1 | 5/2008 | Jogand-Coulomb et al. |
| 2008/0115211 A1 | 5/2008 | Jogand-Coulomb et al. |
| 2008/0115224 A1 | 5/2008 | Jogand-Coulomb et al. |
| 2008/0115225 A1 | 5/2008 | Jogand-Coulomb et al. |
| 2008/0126705 A1 | 5/2008 | Jogand-Coulomb et al. |
| 2008/0137865 A1 | 6/2008 | Sabet-Sharghi et al. |
| 2008/0162947 A1 | 7/2008 | Holtzman et al. |
| 2008/0163201 A1 | 7/2008 | Jogand-Coulomb et al. |
| 2008/0163246 A1 | 7/2008 | Jogand-Coulomb et al. |
| 2008/0243755 A1 | 10/2008 | Jogand-Coulomb |
| 2008/0244713 A1 | 10/2008 | Jogand-Coulomb |

OTHER PUBLICATIONS

Sandisk Corporation, SanDisk Introduces the New Sansa TakeTV Video Player, Oct. 22, 2007 News Release, SanDisk Corporation, Milpitas, CA.

Mary Jo Foley, Microsoft Preps StartKey: A 'Windows Companion' on a USB Stick, Mar. 2, 2008, CNET Networks.

Reza Amini, "TrustedFlash cards with SmartMX technology for more security," May 4, 2006, Mobile 14.com website.

SanDisk Corporation, "SanDisk and SK Telecom Launch New Card-Based Solution for Mobile TV and Personal Video Recording," Feb. 11, 2008, SanDisk Corporate Website.

Michael Singer, CNET re TrustedFlash, Internet web page, Sep. 27, 2005, CNET News.com.

Microsoft, SanDisk Venture Promises Apps on a Thumb Drive, Information Week web page, May 11, 2007.

Brian Kim, Georgia Tech Student Foundation Investments Committee SanDisk Final Comprehensive Proposal—Editors Copy, Nov. 8, 2005.

Mishael Agami, SanDisk Trusted Flash Introduction to the Technology and its Benefits.

* cited by examiner

High-End Example of Application and Data Storage in the NV-RAM

Non-Volatile RAM (NV-RAM)

| Strongly Restricted Access | Unrestricted Read-Only Access | Unrestricted Read/Write Access | End-User Restricted Access |
|---|---|---|---|
| 221 - Secret Application Enablers (e.g. keys, critical software) | 20 - Application Startup Instructions | 21 - Public Application Enablers (e.g. device drivers) | 261 - User application settings |
| 231 - Application Usage Policy Rules | 222 - Main Application Code | | 262 - User application data |
| 232 - Policy Enforcement State Information | | | 263 - User access controls (e.g. passwords, biometric profiles) |
| 24 - Update Control Algorithm | | | |
| 25 - IDPD Identifier (Serial Number) | | | |
| 26 - Operational Code for the IDPD | | | |

INTEGRATED DELIVERY AND PROTECTION DEVICE FOR DIGITAL OBJECTS

CROSS-REFERENCE TO RELATED APPLICATIONS

This application claims priority pursuant to 35 U.S.C. 119 (e) to U.S. Provisional Patent Application Ser. No. 60/803,080, filed May 24, 2006, the entire disclosure of which is incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

BACKGROUND OF THE INVENTION

Commercial software is typically protected from unauthorized copying and redistribution via Digital Rights Management (DRM) techniques embodied in the application software itself. Many DRM systems are designed to limit the use of the application to the first computer on which it is installed, rendering additional copies of the software unusable. Other approaches, such as watermarking, simply provide a means of identifying copied software, providing clear evidence that can be used in taking legal action against users of illegal copies.

The main limitation of software-based DRM is that, although a particular protection scheme may be very sophisticated and difficult to defeat, the entire system can be compromised if and when anyone develops a "crack" for the system and publishes the results, e.g. on the Internet. The designer of the DRM system faces the incredibly difficult task of devising a system that no one in the world can defeat during the expected commercial lifetime of the protected software; prospective software "pirates" need only wait and search the Internet until some clever hacker wins this one-sided contest.

The "dongle" was devised to address this problem by implementing part of the DRM system in custom hardware. This makes it more difficult to defeat any given instance of the DRM (e.g. a single copy of a protected application) and, at the same time, can greatly limit the damage if a particular copy of the application is cracked.

Wikipedia, the free encyclopedia, provides the following definition of a dongle:

"In the computer industry, the word dongle can refer to a small hardware device that connects to a computer to act as authentication for some piece of software. This was its primary meaning in the 1980s and 1990s. When the dongle is not present, the software runs in a restricted mode or refuses to run. Dongles are used by some proprietary vendors as a form of copy prevention or digital rights management because it is much harder to copy the dongle than to copy the software it authenticates."

Successful hardware-based attacks on dongle systems have been demonstrated, and it is important to use the lessons learned from these attacks to minimize this risk; but methods used in these attacks are sophisticated enough that even with a published "recipe" for defeating a particular dongle design, very little market share for the legitimate application would actually be lost to the set of potential users who are willing and able to follow the procedures involved. For example, see:

"Attacks on and Countermeasures for USB Hardware Token Devices" (http://www.grandideastudio.com/files/security/tokens/usb_hardware_to ken.pdf) (PDF) Joe Grand, Grand Ideas Studio, *Proceedings of the Fifth Nordic Workshop on Secure IT Systems Encouraging Co-operation*, Reykjavik, Iceland, Oct. 12-13, 2000, pp 35-57, ISBN 99799483-0-2

This article, which is also referenced in the Wikipedia entry on dongles, illustrates both some of the hardware tactics that were effective against dongle technology of the 1990s and the degree of technical sophistication required in order to use these tactics—even with the aid of step-by-step instructions. It is questionable if even the early-model dongles, which could be hacked by the methods described above, could easily have been circumvented to the extent of supporting large-scale distribution of illegally copied applications. Given the testing and analysis provided by analysts such as Joe Grand, considerably stronger protection could have been provided by dongle technology. But a solution can only be effective if it is accepted in the marketplace.

Although dongles have provided a strong implementation of DRM, this technology is no longer used to any significant extent. To the end user, the dongle represented an additional complication: a new device had to be attached to the computer for each protected application in use, and the loss of a dongle rendered its application unusable. And while the dongle provided a clear anti-piracy benefit to the software provider, it provided the end user with no direct benefits to compensate for its inconveniences. In principle, the dongle is a highly effective system for IPR protection; in reality, this "solution" provides no protection for any application in the market.

They are 3 main types of Remote Activation Systems that are currently in use. Remote Activation by Internet once; Remote Activation with periodic "phone home" functions; and Continuous Remote Activation.

The most common type of Remote Activation only requires the user to activate once by Internet or even by a telephone call. If a user installs the program it will ask the user to activate the program via the Internet, where it will check the serial number and possibly other things like number of valid licenses on that serial number, tie that activation down to that computer by associating it with that computer's hardware state ID, and possibly check the validity of the CD in the drive, etc. Once the Remote Activation server is convinced that it is a valid installation it will then remove a time and/or program feature restriction. Almost all programs will also allow for people who lack an Internet connection to activate the program remotely by placing a telephone call. A user can call a help line and give the help desk operator information such as, for example, a serial number, and in addition he might tell the operator a unique id generated by the program. The help desk operator then gives the user a series of steeps which would include entering in another series of numbers that was generated by the help desk operator's computer, and which will activate the program. This type of activation is susceptible to the same type of attacks that Software-Based Digital Rights Management schemes are vulnerable to:

The use of "cracks" that will remove the restrictions of the program without having to activate it Use serial number generators and/or serial number lists that will fool the Remote Activation Server into thinking it is a valid copy Use of help desk activation number generators that reproduce the activation number that a user would have gotten from the help desk operator A slightly more advanced version of Remote Activation is to have the program require activation upon installation and then go on the Internet and "phone home" to check against an updated serial number list, check hash marks of key files of the program to see if the program was altered, and the like. This is usually done in connection with updates. A common method of defeating this tactic is disabling the update feature on the program and/or programming a firewall to stop that particular program from accessing the Internet. Again, "cracks" are commonly used on these programs—in this case to eliminate the "phone home" function of the program. Finally, some applications can be run effectively on computing devices that have no connection to the Internet and therefore have no access to a "phone home" protection capability.

With the introduction of "always on" Internet connection services, a new form of DRM was introduced that did not require the end user to keep track of new hardware devices. Continuous remote activation systems, like dongle technology, provide most of the code for the protected application in a clear, easily-copied format, and DRM is supported by modifying this clear code in such a way that it can only operate properly through a continuing series of interactions with algorithms and data that are hidden to the application user. In a continuous remote activation system, these enabling resources are provided from a remote server, typically over the Internet. Continuous remote activation systems can provide an excellent level of DRM protection, and they demonstrated the viability of supporting DRM simply through the requirement of occasional short interactions with an enabling control element.

Today, however, continuous remote activation has followed dongles into disuse. Drawbacks to the remote activation approach include the need to maintain a constant Internet connection, and the dependency of all protected applications on the performance and reliability of the data connection (unpredictable) and the activation server (which presents issues of scalability and reachability, and introduces a business dependency on the long-term success of the company that operates the remote activation server).

The present invention (referred to hereinafter as the Integrated Distribution and Protection Device ("IDPD")) combines the basic design principle of the dongle with the compact external storage capability of an NV-RAM thumb drive. It is also capable of providing a scalable implementation of activation algorithms—with a local rather than remote activation engine, providing a guarantee of extremely low latency. It is a unique combination of prior inventions, which solves problems that none of the earlier systems could have solved alone, and addresses a long-felt need in the marketplace.

BRIEF SUMMARY OF THE INVENTION

The Integrated Delivery & Protection Device for Digital Objects ("IDPD") implements a particular set of services that fall within the broad category of digital rights management (DRM).

While the term DRM encompasses every technique that is intended to protect and/or assist in managing the intellectual property rights (IPR) of the creators and distributors of digital content, the IDPD is more specifically optimized to provide:

A value-added method of distributing digital content that is Convenient for use by one or more end-users
Readily portable among multiple computing devices, with the preservation of the users' settings and data
Which provides the owners of the intellectual property embodied in the digital content with
Strong protection against any form of illegal copying and redistribution of the digital content
A means for making smaller-scale violations of their IPR sufficiently inconvenient that this activity has highly limited impact on their addressable market
A value-added distribution model that, without compromising the objectives above, implements a policy of only one use of the content at a time per license, independently of the
a. Computing device on which the digital content is being used
b. Identity of the end-user of the content at any given time
A solution that can be implemented today, and steadily improved as a natural consequence of industry progress in the implementation of non-volatile random-access memory (NV-RAM) systems.
The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims. A more complete appreciation of the invention and many of the advantages thereof will be readily obtained as the same becomes better understood by references to the detailed description when considered in connection with the accompanying drawings, wherein:

DETAILED DESCRIPTION OF THE INVENTION

As required, one or more detailed embodiments of the present invention are disclosed herein; however, it is to be understood that the disclosed embodiments are merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

As used herein, the term "digital content" is used broadly to encompass many different types of digital objects, such as application software, digital media recordings, and any other digitally-represented information, now known or developed in the future, for which the intellectual property rights owner (s) wish to control usable distribution.

The Integrated Distribution and Protection Device builds upon the basic design principle of the dongle with the compact external storage capability of an NV-RAM thumb drive. It is also capable of providing a scalable implementation of activation algorithms—with a local rather than remote activation engine, providing a guarantee of extremely low latency.

The IDPD provides an improvement in the level of DRM protection provided by current mechanisms, because the incorporation of the application onto the NV-RAM part of the drive provides an excellent opportunity to encrypt key parts of the software code and/or introduce dependencies on critical code segments that are executed in protected memory segments. Restricting access to key enabling objects makes direct copying of the software extremely difficult, and it eliminates the ability to get a clean copy of the program from a system RAM dump—a common method for getting access to program code for analysis and "cracking."

But perhaps the greatest advantage of combining the application delivery and protection systems into a single compact package is in the convenience this provides for the end user. The user can move from computing device to computing device with the same IDPD, while keeping application settings and saved files on the device—all while using a single license of the software. This will eliminate one of the most common software piracy techniques of buying one copy and installing the software on all the computers that a person owns despite going over their legal license's limit; instead, it supports the intuitive "book" model for the intellectual property in the application. Indeed, the IDPD extends the "book" analogy still further, by easily supporting the use of the same application by different users on different computing devices—but never allowing a single licensed copy of the application to be used two or more times concurrently.

Unlike a basic dongle, this device is both the software and the control system; so one is never left with the problem of non-working software because of a lost dongle. Particularly when the IDPD is implemented with a wireless interface and a compact multi-application package, the "add-on device that's easily lost" [dongle] has now become a useful package that stays with the user even as the user moves among computers and environments (work, home, travel, and the like).

The use of a local activation engine provides a unique benefit that is not feasible with remote activation. Because each instance of the application code that is distributed is packaged with its own physical activation engine, the root encryption key and subtle but important details of the activation model can be unique to each copy of the application, increasing the difficulty of developing a "crack" for the application in general. Cracking the application algorithm is also complicated by having the interactions of the application code with the activation engine take place within a hardware device, rather between a computer and a server with which it must communicate across a shared network such as the Internet.

By packaging the activation engine with the software, the IDPD also overcomes a key drawback of the popular "lockdown" model of DRM, in which the act of installing the application on a particular computer causes the application to become dependent on "seeing" the exact computer configuration on which it was installed whenever the application is run thereafter. It is unrealistic to assume that the configuration of any given computer will remain fixed over time, because the user is likely to add or upgrade various peripherals and components and/or to replace components that fail. So "lockdown" DRM schemes always require some mechanism by which the holder of the intellectual property (or a designated agent) can "permit" the user to continue to use an application for which he/she hold a legitimate license, whenever a computer upgrade or repair violates the arbitrary conditions to which the application has been locked. In contrast, the IDPD is "locked down" to a single configuration assumption—the presence of the IDPD itself—that is packaged with the application itself, rather than with any particular device on which the application is being used.

Finally, the digital rights protection in the IDPD is implemented and provided by the provider of the protected application and affects only the functioning of the application it protects. IDPD does not depend on ceding control of any part of the DRM algorithm to the provider of the computer operating system or any other general computing platform.

A number of inventions have been documented for providing digital rights management functions with the aid of a trusted hardware adjunct to the user's computing device. In addition to the "dongle," described above, several methods have been defined in which a single hardware adjunct device can provide a wide range of DRM services for a wide range of digital objects. With these inventions, the protected object (e.g. application program), the associated usage policy rules, the hardware adjunct, and the end-user computing device are integrated through the sophisticated use of cryptographic techniques.

While the protected digital objects may be distributed on a mass basis via both current methods (e.g., pre-written storage media and network downloads), the definition of usage policies, and the tools by which the hardware adjunct can enforce those policies, are typically distributed via a network of servers that communicate with one another, with the end-user computing device, and with the hardware adjunct via a cryptographic infrastructure for the distribution of symmetric and asymmetric encryption keys, digital certificates, secure electronic signatures, and the like.

While the hardware adjunct devices in these inventions provide a far more general set of functions than a basic dongle, these devices all resemble the dongle in one respect. In order to be able to store the control elements (e.g., symmetric encryption keys and critical code segments) for multiple applications and the communication tools (e.g., public asymmetric encryption keys for various network servers), the devices are dedicated entirely to limiting what the end-user can do, rather than providing any end-user value by themselves. This is unfortunate, because it is this lack of obvious end-user benefits that created the market resistance that prevented the adoption of dongle technology in its earlier form.

Given the efficiency of a general hardware adjunct and the value that it could add to the overall process of distributing and licensing digital objects, a pure lock-and-key hardware adjunct might eventually be adopted by the industry (and, more importantly, its customer base) despite its lack of direct customer value. But, there is another issue that is likely to delay the widespread use of the generalized adjunct model.

The basic model for generalized-adjunct DRM is to separate the protected object, policy rules, and policy-enforcing adjunct device, distribute them independently, and then re-integrate them into a secure structure when the end-user installs and activates the digital object on a computing device. It is easier to take things apart than to put them back together.

Re-assembling the various components of a dissected secure application requires the deployment of a complex infrastructure for secure integration. Each instance of the digital object that is being distributed may need unique control elements (encryption keys or critical code segment linking requirements); each end-user purchase associates the user's unique application and adjunct with a particular set of policy rules; each server authorized to distribute control elements needs to establish secure channels with its clients. All of the participating servers, adjuncts, digital objects, etc. need to be correctly cross-referenced—and tools must be provided for making changes to any part of the system, for reasons as commonplace as a software bug fix or as drastic as the compromise of a root encryption key.

Because this integration step must be able to support many different digital objects, from different developers and suppliers, practically every element of this infrastructure, and every interface among these elements, will need to be standardized. Data dictionaries, software authoring systems, and much of the cryptographic infrastructure in place today can manage much of the complexity of integrating a separate-components DRM approach, but unless a very high degree of consistency is maintained among all parties using the system, integration will fail for a lack of basic data integrity. It is illustrative that a patent application published in 4q2003 for an integration-based DRM implementation acknowledges the need to adopt even a standard "DRM language" for policy specification (see U.S. Patent Publication No. 2003/0217001, by Pienado). "Solutions" for these standardization problems that are provided by a single platform vendor face a barrier of industry suspicion; more general solutions adapted to the needs and interests of many independent suppliers require a long time to evolve to a well-accepted, stable solution—as is witnessed by the difficulties that have been faced by the Liberty Alliance in establishing an open, distributed model for electronic commerce.

The benefits of establishing an infrastructure that can support strong, general DRM services will be substantial. So will the benefits of an open, distributed e-commerce system. For this reason, both are likely to be implemented—some day. For the reasons described above, that day will not come soon.

The basic premise of the IDPD is that, in the here and now, the most effective way to integrate a digital object, DRM policies for that object, and DRM enforcement tools is by never separating them in the first place. The IDPD requires one or more standard communication interfaces to the user's computing device. The use of USB, USB2, external Serial ATA, wireless USB, Firewire, Firewire 800, Compact Flash, Secure Digital (SD), miniSD, microSD and/or other data communication interfaces that are currently in widespread distribution makes it possible to begin delivering digital objects on this vehicle immediately, to a wide audience— without precluding the use of more effective interface technologies in the future. Local-area or wide-area wireless interfaces, such as WiFi and WiMax could also be used, particularly in conjunction with multi-user licenses. Beyond that one dependency on the set of interfaces available for the relevant computing devices, separate implementations can be made for the IDPD for each participant in the value chain for digital objects and IDPD protection.

The initial IDPD may use a combination of protected and user-accessible flash memory to partition an application and its control elements (e.g. encryption or concealed critical software elements), an embedded microprocessor to provide appropriate access to these memory segments, a hardware encryption device, one or more computing device interface controllers, and an interconnection fabric (e.g. bus) among these elements. But a more sophisticated implementation may improve performance by using a hybrid of conventional flash memory for most of the stored digital information and a higher-performance NV-RAM technology (such as Phase-Change RAM, Magnetoresistive RAM, Ferro-electric RAM, SONOS, NRAM, or RRAM) for smaller segments of latency-critical code. The providers of digital objects to be protected by IDPD are free to shop for the implementations that best meet their needs, knowing that the end user will see only the standard interface and the overall performance of the implementation. In the longer term, flash memory may be displaced entirely by a newer form of NV-RAM with better performance and endurance at an acceptable cost. This change can be accommodated as easily as near-term technology changes for specialized NV-RAM segments.

The providers of digital objects are free to define their own policy rules, policy enforcement tools, software development environment, distribution channels, encryption technology, etc. Since each digital object will come packaged with its entire DRM environment, the internal workings of the DRM can be entirely different for each digital object distributed on this medium.

With the steady, predictable improvement in NV-RAM storage capacity, it will eventually be possible to provide a number of digital objects, each on its own physically independent IDPD, in a compact physical package, providing the end-user with a convenient package for many or all of her/his digital objects, together with their settings and data files, fully portable among computing devices and supporting the "book" model of multi-user usage. Yet each digital object, its DRM policy definitions and enforcement mechanisms, will be developed and maintained independently by its supplier without need of any new industry standards or infrastructure. Even as the capabilities for an "integration" DRM model gradually fall into place, they will face increasingly strong competition from the simpler IDPD model. It could be a long time indeed until the integration model for generalized adjuncts can change the paradigm.

While methods for using a hardware adjunct to a standard computing device have evolved, from the basic single-purpose dongle to generalized adjuncts supported by a complex infrastructure, a basic change in the technologies for hardware adjuncts has taken place largely unnoticed in the DRM field.

With current-generation flash memory, it is already possible to store a complete digital object (e.g. a major software application) on the same hardware adjunct that tracks and enforces DRM policies. By using this capability to maintain the integrity of a digital object and its DRM at the physical level, the IPDP provides a unique combination of end-user value and a simple, straightforward DRM implementation to the intellectual property rights holder. With the IDPD, the end-user gains immediate access to the digital object and associated files, settings, plug-ins, macros, scripts, cookies, and the like on any appropriate computing device, and the IPR holder is provided with a highly secure means of protecting the digital object from any significant degree of illegal distribution.

The IDPD represents an opportunity for strong DRM. Generalized hardware adjuncts might represent a future implementation of DRM, though the infrastructure requirements of this approach could make that future rather distant.

Figure 1:
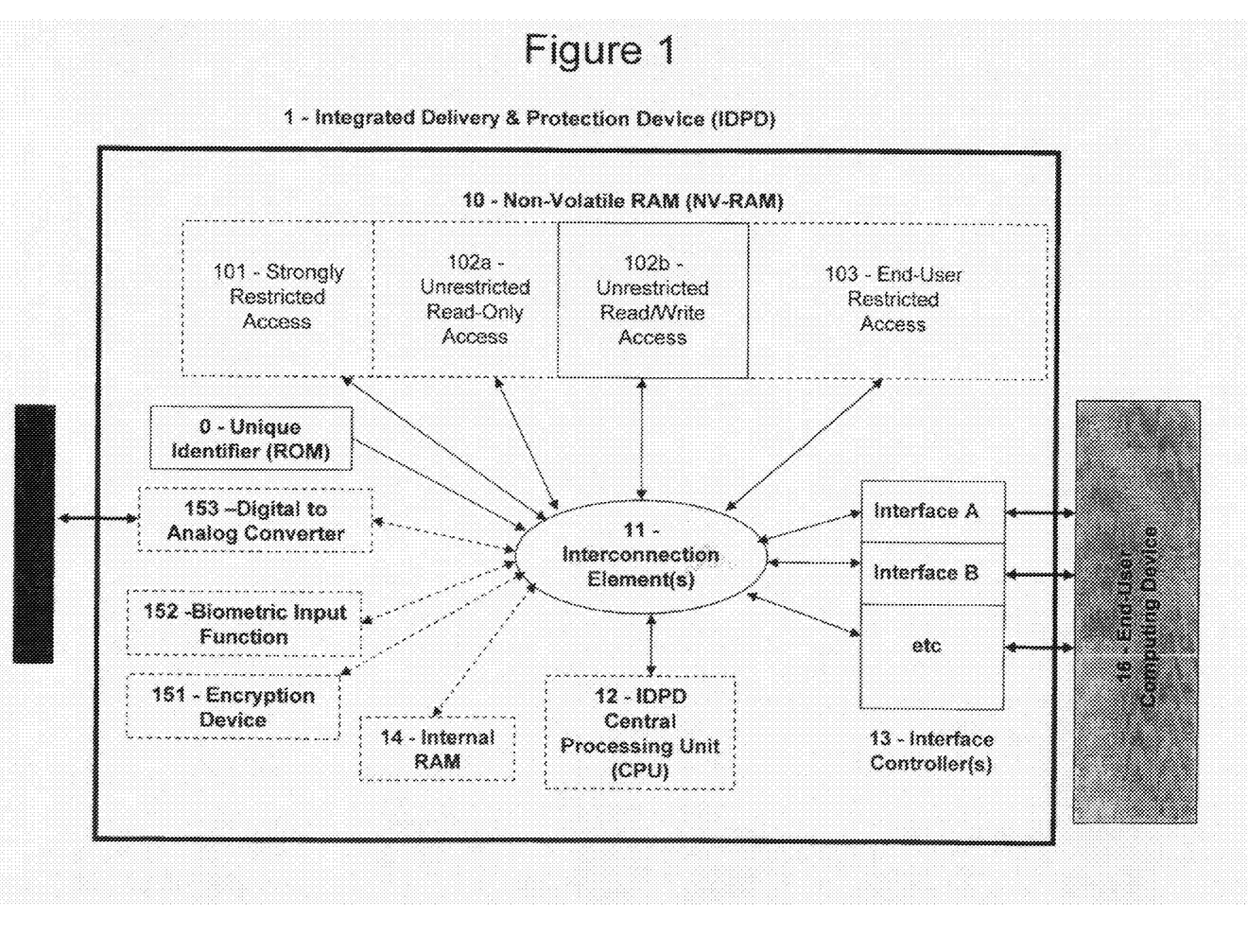
FIG. 1 provides a functional representation of one embodiment of an IDPD constructed in accordance with the teachings of the present invention.

Turning now to the drawings, wherein like numerals indicate like parts, FIG. 1 provides generally one embodiment of an IDPD constructed in accordance with the teachings of the present invention.

In FIG. 1, the main box (1) represents one embodiment of the IDPD. It is shown connected to an end-user computing device (16). The functional components illustrated in this embodiment of the IDPD are:

Read-only memory, containing at least a "hardware serial number"—a unique identifier (0) for the device.

Non-volatile RAM (10). One or more of the following types of access can be provided for different NV-RAM partitions: (a) completely restricted access NV-RAM (101); (b) unrestricted Read-Only Access NV-RAM (102a); (c) unrestricted Read/Write Access NV-RAM (102b); (d) end-User Restricted-Access NV-RAM (103).

Interconnection Elements (11)

Optionally, a central processing unit (12)

Interface controller(s) (13)

Optionally, internal RAM (14)

Other optional hardware functions could also be packaged into the IDPD for value-added functionality, including (a) an encryption device (151); (b) a biometric input function (152); and (c) a digital to analog converter (153).

FIG. 1 is a purely functional representation of the IDPD. Several different hardware implementations exist for the functions described in FIG. 1, and no 1-1 correspondence is assumed between the functions and the hardware devices that carry them out in any particular instantiation of the IDPD.

The IDPD could be implemented as a single complex integrated circuit or as a "chip set" made up of several interconnected integrated circuit devices. The only new functional requirement introduced by the use of a "chip set" implementation is that the current state of the art in secure packaging be used, to deter would-be crackers of the system from observing the interactions among the components, as a first step in reverse-engineering the system and/or defeating its protection mechanisms.

The NV-RAM subsystem is responsible for storing the protected digital object (e.g. an application program), associated control and complementary objects (e.g. startup instructions and any needed device drivers), the policy decision criteria for legitimate use of the digital object, the policy enforcement tools that prevent users from circumventing those rules, the basic operating code for the IDPD itself, and an update control algorithm that enables the owner of the intellectual property in the digital object (and no one else) to alter any of the information in the system when this is required in order to update the digital object or counter a security compromise.

The NV-RAM can also (optionally) provide an area where the end-user can store application settings, end-user data, and/or end-user security controls such as passwords or biometric profiles. This segment of the NV-RAM could have its access limited via a master end-user access control mechanism, enabling the end-user to have protected access to this information so that anyone else who obtains this user's IDPD will have great difficulty obtaining confidential information from it.

An embodiment of the NV-RAM subsystem designed for very high levels of DRM enforcement and user convenience is illustrated in FIG. 1, providing four segments of NV-RAM, with access to each segment managed in a different way.

The strongly-restricted access segment (101) can only be read or written to by externally unobservable internal interactions within the IDPD, or via the update control mechanism.

The data stored in the unrestricted read-only access segment (102a) can be read by any computing device connected to the IDPD, but it can only be written to by externally unobservable internal interactions within the IDPD, or via the update control mechanism.

The unrestricted read/write segment (102b) can be read or written to by any computing device connected to the IDPD.

The end-user restricted access segment (103) can, at the option of the end-user, have its read and write functions restricted to the end-user, requiring identification such as a password, token, or biometric reading before granting access to its data and its storage capabilities. Note that the end-user restricted segments could be logically partitioned into several different segments for different end-users who employ the IDPD and its digital object(s) sequentially.

The hardware elements embodying the functional components of the IDPD are interconnected via one or more hardware interconnection systems (e.g. one or more buses and/or crossconnect fabrics). These interconnection systems can embody some of the policy enforcement functions to provide the access restrictions for the various NV-RAM segments.

The overall functions of the IDPD can be implemented by the execution of internally-stored operational code, on one or more microprocessors, viewed collectively as the "central processing unit" of the IDPD. The use of an internal CPU by the end-user, avoids making critical IDPD code and operational functions observable by the end-user in an IDPD driver provided with the device.

There are several different ways in which the IDPD can be connected to the computing device it supports. Examples include USB, USB2, external Serial ATA, Firewire, Firewire 800, Compact Flash, Secure Digital (SD), miniSD, microSD, and short-range wireless interfaces such as Bluetooth. Among the newer interfaces that are being introduced, wireless USB is an excellent example of a short-range wireless connection with excellent performance. Local-area or wide-area wireless interfaces, such as WiFi and WiMax could also be used, particularly in conjunction with multi-user licenses. Manufacturers of IDPDs can provide interface controllers for one or more of the available interfaces to the IDPD to meet the needs of their markets and the current state of technology.

The use of an IDPD "CPU" to execute operational code, manage state information, and perform other functions could be optimized by the addition of an efficient internal memory store for volatile data related to the operation of the IDPD. This function could be implemented with conventional Dynamic Random Access Memory (DRAM) Static Random Access Memory (SRAM), or other internal random-access storage technology. Depending on the economic and functional tradeoffs for a particular use of the IDPD, this function could be carried out by the NV-RAM segments.

The IDPD can be adapted to a number of special needs through the addition of other hardware modules. The examples shown are: (a) encryption hardware (151), particularly useful if the implementation of access controls or the nature of the data used by the protected object require the encryption and decryption of large amounts of data "on the fly," with a low processing delay; (b) a biometric input processor (152), to provide strong user authentication; and (c) a digital to analog (D/A) converter, to convert the output of the IDPD to an analog format before it leaves the device.

Figure 2:
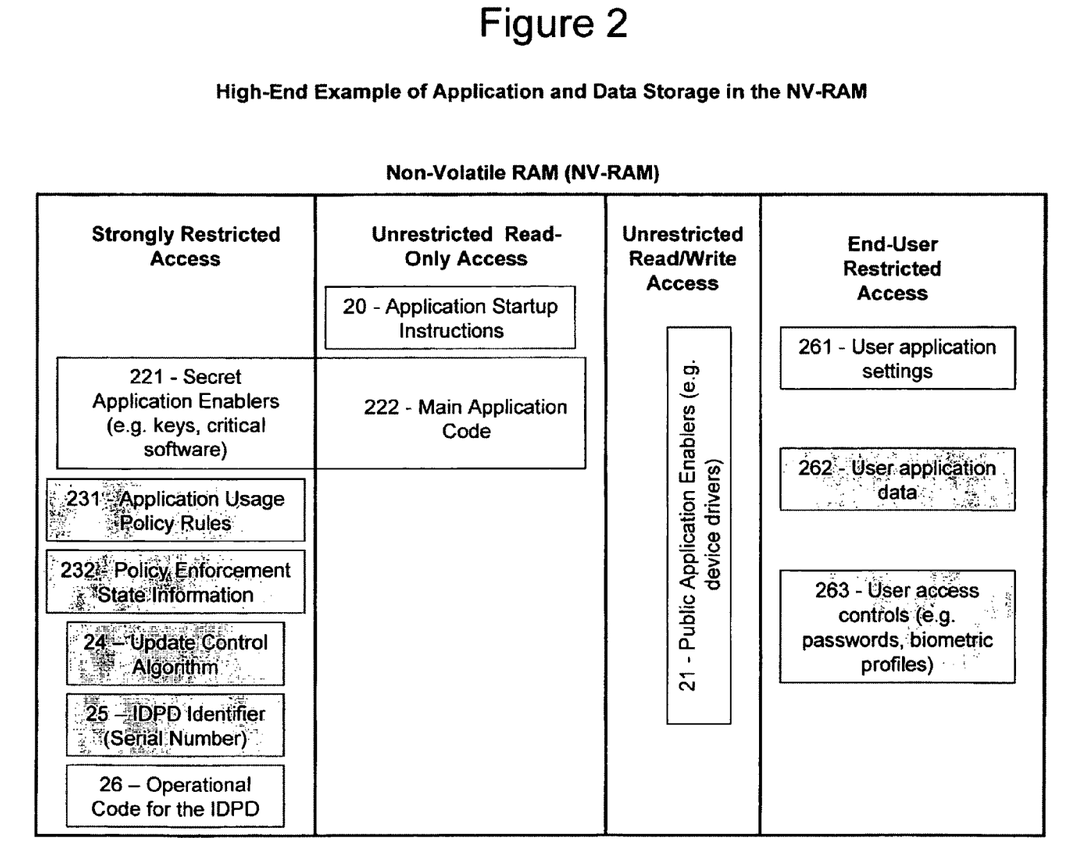
FIG. 2 provides a high-end example of application and data storage in NV-RAM.

FIG. 2 illustrates how the IDPD could use partitioned NV-RAM to deliver this capability in a way that provides a very high degree of DRM effectiveness and end-user convenience.

Following the description of this form of high-function implementation of the IDPD, we now describe some of the ways in which a subset of the functionality illustrated in FIG. 1 could be used in a simpler IDPD.

The key to the enforcement of DRM policies in the IDPD is that even though most of the content of the protected object is directly accessible to the end-user, there is no value in distributing digital copies of this object because a set of critical enablers for the object are placed out of the user's direct reach.

In FIG. 2 it is assumed that the protected object is a software application (though other types of digital object can be protected with an IDPD). The "public" application code (222)—and the startup instructions to launch the application, both initially and in later use (20)—are stored in the unrestricted read-only access segment. But the public application code is insufficient to run the application by itself. In order to run properly, the application also needs access to the "secret application enablers" (221) that are stored in the strongly restricted access section.

Splitting an application into a large block of "public" code and a much smaller set of "secret enablers" can be—and has been—done in several different ways. For example, if decryption can be done quickly "on the fly," all or part of the public code could be encrypted, and the encryption keys would be the secret enablers. The performance requirements for this implementation can typically be achieved through the use of symmetric encryption, with hardware assistance. Alternatively, "critical code segments"—necessary to perform essential application functions and/or to provide proper sequencing of the code for execution—can be held out as the secret information, requiring the application to refer to the secret material whenever the execution of the code reaches a dependency on the missing material. These methods above can also be combined in various ways.

Tactics that increase the difficulty of inferring the secret information from the behavior of the application include: (a) concealing the interactions between the "public" and "secret" information in a secure communication channel; (b) creating a large number of places in the code where reference to secret information is required—and an even larger number of places where it seems to be required; and (c) using an automated process to provide "mass customization" of the pairs of public and secret information, so that it is difficult to determine the general rules by which the public/private dependencies are created.

While these particular examples are somewhat simplistic, the fact is that the DRM community has done a rather good job of using encryption, critical code segment isolation, and other approaches to create dependencies of large, publicly distributed digital objects on small sets of enablers.

Typically, however, any given approach will be more effective with some types of digital objects than with others. For example, a complex, interactive computer application hardly ever follows the same path through the code twice, making it very difficult to reconstruct the entire application from piecemeal fragments that a hacker might obtain by observing the application's behavior. On the other hand, a digital music or video recording plays exactly the same digital content every time it's used, and if one can capture that content in digital form, the result is a perfect illegal copy of the "protected" digital object.

One of the main benefits of the IDPD is that it can be used to implement any and all of the techniques that have been or are being developed for splitting a digital object into a main component and a set of enablers. Because the IDPD itself is impartial, within these broad boundaries, to the particular DRM technique that is used, the IDPD can concurrently support as many DRM approaches as there are in use at any time—without requiring the digital object providers to agree on a single, standard approach, and hence without requiring the development of a single DRM technique that is effective for all types of digital object.

Some of the key enablers for a digital object are anything but secret. Many computer applications, for example, require the use of drivers for a variety of $3^{rd}$ and $4^{th}$ party device manufacturers. These drivers are freely available on the Internet (since one has to buy the associated devices to get any use out of them), and that's the best place to get the constant series of revisions that seem to be a basic part of the driver world.

In FIG. 2, device drivers and other general-public application enablers (21) are stored in the unrestricted read/write segment of NV-RAM, where the end-user can easily keep them up to date, while maintaining the portability of the IDPD among computing devices.

Making the usefulness of a digital object dependent on a securely controlled set of data makes it possible to enforce rules about the way in which the digital object is used. Implementing this control function in mass-customized hardware makes it particularly difficult to mass-produce a control-free modification of the digital object. Distributing the digital object, its control data, and the device so that they work together in a self-contained physical package makes these tools available across a wide range of digital objects, intellectual property owners, and DRM algorithms.

In the IDPD, the definition (and specification language) for usage policy rules is left up to the provider of the digital object—as is the choice of state information that will need to be tracked to measure compliance with the rules. In FIG. 2, the application policy rules (231) and policy enforcement state information (232) are simply data, stored in the strongly restricted access NV-RAM.

The digital object stored in an IDPD is likely to go through multiple updates, bug fixes, etc., and the DRM algorithm itself will undergo changes (particularly if it is eventually compromised). The end-user can't just download these updates, because important parts of the NV-RAM are protected. And at least for most of these changes, it would be economically infeasible to send out a mass physical mailing of new IDPDs. Some sort of update mechanism is required.

The Update Control Mechanism (24) in FIG. 2 provides the provider of digital objects via IDPD with a secure channel to update any and all programmable elements of the system, even those in strongly-restricted NV-RAM.

The provider of each digital object supported by IDPD develops (or purchases) his/her own update control algorithm and installs it in the IDPDs before they are shipped. The provider is also responsible for her/his own personnel and the company's policy for management and control of the keys. In other words, those with the strongest incentives to prevent the update control algorithm from being compromised have the most say over how well it will be protected. Further, as digital transactions go, updates are relatively infrequent. The less often a secure channel is made observable through its use, the less likely it is that someone will crack it. The IDPD also provides an option for the inclusion of sophisticated encryption and secure communication hardware. Providers of high-value digital objects are likely to use this feature to their advantage. Finally, if the update control algorithm for some particular digital object provider is compromised it won't affect any other digital object provider unless they used exactly the same algorithm and settings.

Each IDPD has a unique identifier—the only obvious function in this device for conventional Read-Only Memory (ROM). Providers of IDPD-formatted digital objects can encourage their customers to register the product, including an identifier of their own choosing that can be used to report IDPD failures, IDPD defects, and the loss or theft of an IDPD. Upon receiving notice that an IDPD has gone out of legitimate service for any of these reasons, the provider can use the update function to disable that unit if and when it is ever attached to an Internet-connected device, and provide a replacement to the original owner, e.g. by overnight delivery.

The street value of an invalidated IDPD is expected to be rather low; so there is little incentive for abuse of this service.

The issue of user data stored on the IDPD is the reason for providing an end-user restricted access segment in the NV- RAM. In order to store or retrieve information in this segment, the user needs to be authenticated. User data, and even application settings, have both the convenience of portability among computing devices for the legitimate user and protection from misappropriation if someone else gains physical access to the IDPD.

In some DRM systems, several of the functional components—"public" code, secret enablers, identifiers, policy rules, etc.—are distributed separately. These approaches require an "integration system"—sometimes rather complex—to put the pieces back together securely.

Because all the components of an IDPD are produced, distributed, and delivered together in a single physical package, the only "integration system" that is needed is the basic operational code for the IDPD itself (25)—which is also part of the basic physical package.

The functional implementation of the IDPD described above and in FIGS. 1 and 2 illustrates the ability of this invention to deliver a digital object in a form that supports a very strong form DRM, while providing the end-user with a highly portable digital object format. These illustrations demonstrate that the IDPD can deliver these capabilities with today's technology and infrastructure, and without the need for the entire industry to agree on complex DRM standards and provide corresponding networked support.

The implementation described in FIGS. 1 and 2 integrates a large number of hardware and software functions. It is also possible to provide simpler implementations of the IDPD, albeit with a lower degree of DRM security and end-user functionality. For some digital objects, these tradeoffs may be the best way to meet the needs of the market. Some simplified IDPD implementations are described below, to demonstrate the versatility of the basic IDPD invention.

The simplest implementation of the IDPD would use only the following functional components: (a) a unique identifier for the IDPD in read-only memory (ROM); (b) unrestricted read-write access NV-RAM; (c) internal connection elements within the IDPD (e.g. a simple bus); and (d) one or more interface controllers to connect the IDPD to the computing device.

In this implementation, the digital object itself (e.g. the application code) could be designed to query the IDPD periodically to validate its connection to the computing device. This step could make use of the IDPD's unique identifier, perhaps with some obfuscation through the use of the IDPD's internal clock. If the presence of the IDPD is not validated, the application stops working properly. All computing functions are performed within the end-user's computing device, using instructions that are distributed with the IDPD in element (102*b*).

Additional security could be obtained by introducing a strongly-restricted NV-RAM segment (101) that can hold more effective policy enforcement data objects. This segment also enables the frequent interactions of secret information with the digital object in (102*b*) to be updated, through the use of a much less frequently used "root key" in element (0).

Addition of internal processing capability (12) to the IDPD makes it possible for policy decision and enforcement actions to be carried out entirely within protected elements of the IDPD, rather than enabling the end-user to view these interactions or their software.

Limiting the end-user's ability to alter the main digital object and its startup elements in an element such as 102*a* protects the applications from being damaged by a computer malfunction (or by a worm or virus), as well as providing an additional challenge to malicious "users" who are trying to crack the system. Addition of the end-user store (103) increases the effective portability of a digital object packaged in an IDPD for its legitimate user(s).

Various subsets of the functional components described in FIG. 1 can be used to match the complexity and manufacturing cost of the IDPD to the market requirements of a particular digital object.

The foregoing description, examples, and drawings are exemplary in nature and are not meant to limit the present invention. It will be obvious to those of skill in the art upon reading this disclosure that many variations of the present invention are possible without departing from the spirit or scope of the invention described herein. For example, although the present invention has been described above as pertaining primarily to a convenient and effective way of enforcing single-user licenses to protected digital objects (the "book" analogy described above), it is contemplated that the present IDPD device can support multiple concurrent "connections." The number of concurrent uses of the protected object that any given embodiment of the present IDPD supports is preferably implemented in the algorithms and state information programmed into the protected NV-RAM of the IDPD, working with particular interfaces to the computing device. For example, Certified Wireless USB is physically capable of interacting with up to 127 logical ports, communicating at a media bandwidth of 110 Mbps at a distance of 10 meters. A sophisticated control algorithm in the IDPD can support multiple concurrent connections, up to a limit specified in the user-inaccessible NV-RAM.

Further, for some digital objects there is a natural pairing between the IDPD and other portable electronic application devices, such as PDAs, cell phones, digital media players, or portable game machines. Future versions of some of these devices could include "expansion slots" for one or more IDPDs that provide controlled access to digital objects that could be shared between the portable application device and a connected PC. The storage of data and configuration information on the IDPD would inherently maintain data integrity between the portable application device and the PC with need for a separate synchronization process.

These and other uses of, and modifications to, the present invention will be apparent to those of skill in the art upon reading this disclosure.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall there between.

What is claimed is:

1. A method of securing and controlling a digital object to prevent unauthorized distribution of the digital object by an end user, the digital object being portable for distribution from a distributor to the end user across at least one digital device and having a secure hardware adjunct in communication with the at least one digital device, the method of securing the digital object comprising:

executing a first portion of code on the at least one digital device in communication with the secure hardware adjunct; and using the secure hardware adjunct to execute predefined digital rights verification and enforcement (a) located on the secure hardware adjunct, (b) configured prior to distribution of the secure hardware adjunct to the end user, and (c) updatable by a provider of the digital object using a secure channel after distribution of the secure hardware adjunct to the end user;

providing another storage data capacity on the secure hardware adjunct to control users access to the digital object by allowing the provider of the digital object to disable the secure hardware adjunct;

providing access management within the secure hardware adjunct of a plurality of NV-RAM segments that (a) enables different levels of access between the plurality of NV-RAM segments to provide different levels of access to different ones of the plurality of NV-RAM segments, and (b) provides the end user with (i) restricted access to a first one of a plurality of NV-RAM segments, (ii) unrestricted read only access to a second one of the plurality of NV-RAM segments, (iii) unrestricted read write access to a third one of the plurality of NV-RAM segments, and (iv) end-user restricted access to a fourth one of the plurality of NV-RAM segments; and controlling the digital device and user access to the digital object at a remote location to permit disabling of the secure hardware adjunct via a remote-disable feature of the secure hardware adjunct that is enabled upon connection of the adjunct to a digital device with a network connection, the remote-disable feature controlled by the distributor of the digital object, wherein, the access management having restricted access to the first one of the plurality of NV-RAM segments is storage data capacity on the secure hardware adjunct to control user access to the digital object by allowing the provider of the digital object to disable the secure hardware adjunct, the access management having unrestricted read only access to the second one of the plurality of NV-RAM segments is storage data capacity on the secure hardware adjunct for mail application code, and the access management having end-user restricted access to the fourth one of the plurality of NV-RAM segments is an end-user managed storage data capacity on the secure hardware adjunct for user application data, user application settings, and user access controls that can be controlled by the end user.

2. The method of securing the digital object according to claim 1, further comprising:
securing against unauthorized access of end-user data that is provided by the end user by requiring a password, biometric inputs, or other user-specific identifier to access the end-user data.

3. The method of securing the digital object according to claim 1, further comprising:
enabling communication of the digital object with the secure hardware adjunct by two-way communication by a standard or non standard interface method, integration of the secure hardware adjunct functions into a larger chip set or an integrated circuit device to support functions of the digital device, or two-way communication with the secure hardware adjunct configured and policy-managed for multi-user over an area communication protocol.

4. The method of securing the digital object according to claim 1, further comprising:
enabling communication of the digital device with the secure hardware adjunct by analog or digital interfaces.

5. The method of securing the digital object according to claim 1, wherein the communication of the digital device with the secure hardware adjunct is supported by hardware for the decryption or presentation of media content.

6. The method of securing the digital object according to claim 1, wherein a unique identifier is associated with the secure hardware adjunct to enable periodic validation of the secure hardware adjunct by the digital object using an internal clock within the secure hardware adjunct and to permit the digital object to stop working if the secure adjunct is not validated.

7. The method of securing the digital object according to claim 1, further comprising:
implementing digital rights management for the digital object by having processing elements and internal RAM on the secure hardware adjunct to run at least one or critical code segments and critical decryption processes directly on the secure hardware adjunct to generate values to a main application.

8. The method of securing the digital object according to claim 4, further comprising:
outputting from the secure hardware adjunct in an analog format by processing digital material through a digital to analog converter on the hardware adjunct.

9. The method of securing the digital object according to claim 1, further comprising:
storing user access controls on the hardware adjunct.

10. The method of securing the digital object according to claim 1, further comprising:
obtaining local access to the digital object to remotely control the digital object by providing an update control mechanism to temporarily override access control restrictions of at least one of the plurality of NV-RAM segments on the secure hardware adjunct to enable remote modification of data stored in the secure digital adjunct.

11. The method of securing the digital object according to claim 1, wherein the digital device is a computer, a laptop, a PDA, a television, a stereo, a car, a cell phone, or a gaming device.

12. The method of securing the digital object according to claim 1, wherein the digital object is application software or digital media.

13. The method of securing the digital object according to claim 10, wherein the access is obtained over a secure channel.

14. The method of securing the digital object according to claim 1, wherein the predefined digital rights verification and enforcement located on the secure hardware adjunct control access to the digital object and is capable of blocking access to the digital object of the end user.

15. The method of securing the digital object according to claim 1, further comprising:
providing access management within the secure hardware adjunct of a plurality of NV-RAM segments,
wherein the access management provides (i) restricted access to a first one of the plurality of NV-RAM segments, (ii) unrestricted read write access to a third one of the plurality of NV-RAM segments, (iii) unrestricted read write access to a third one of the plurality of NV-RAM segments, and (iv) end-user restricted access to a fourth one of the plurality of NV-RAM segments.

16. The method of securing the digital object according to claim 1, wherein the digital object is application software distributed by the distributor via the secure hardware adjunct and the secure hardware adjunct allows the user to save information related to the application software on the secure hardware adjunct to permit use of the application software on different digital devices while maintaining application software settings of the user.

17. The method of securing the digital object according to claim 15, wherein
the first one of the plurality of NV-RAM segments is secret application enablers, application usage policy rules, policy enforcement state information, update control algorithm, and IDPD identifier, and IDPD operational code;
the second one of the plurality of NV-RAM segments is application startup instructions and main application code;
the third one of the plurality of NV-RAM segments is a device driver; and
the fourth one of the plurality of NV-RAM segments is user application settings, user application data, and user access controls.

18. The method of securing the digital object according to claim 1, wherein the capability of being updated by a provider of the digital object after distribution of the secure hardware adjunct to the end users using a secure channel includes disabling the secure hardware adjunct.

19. The method of securing the digital object according to claim 1, further comprising:
running an application using application code entirely contained within the secure hardware adjunct.

* * * * *